Nov. 1, 1932.   J. W. PARKER   1,886,219
BEARING
Filed Sept. 27, 1929
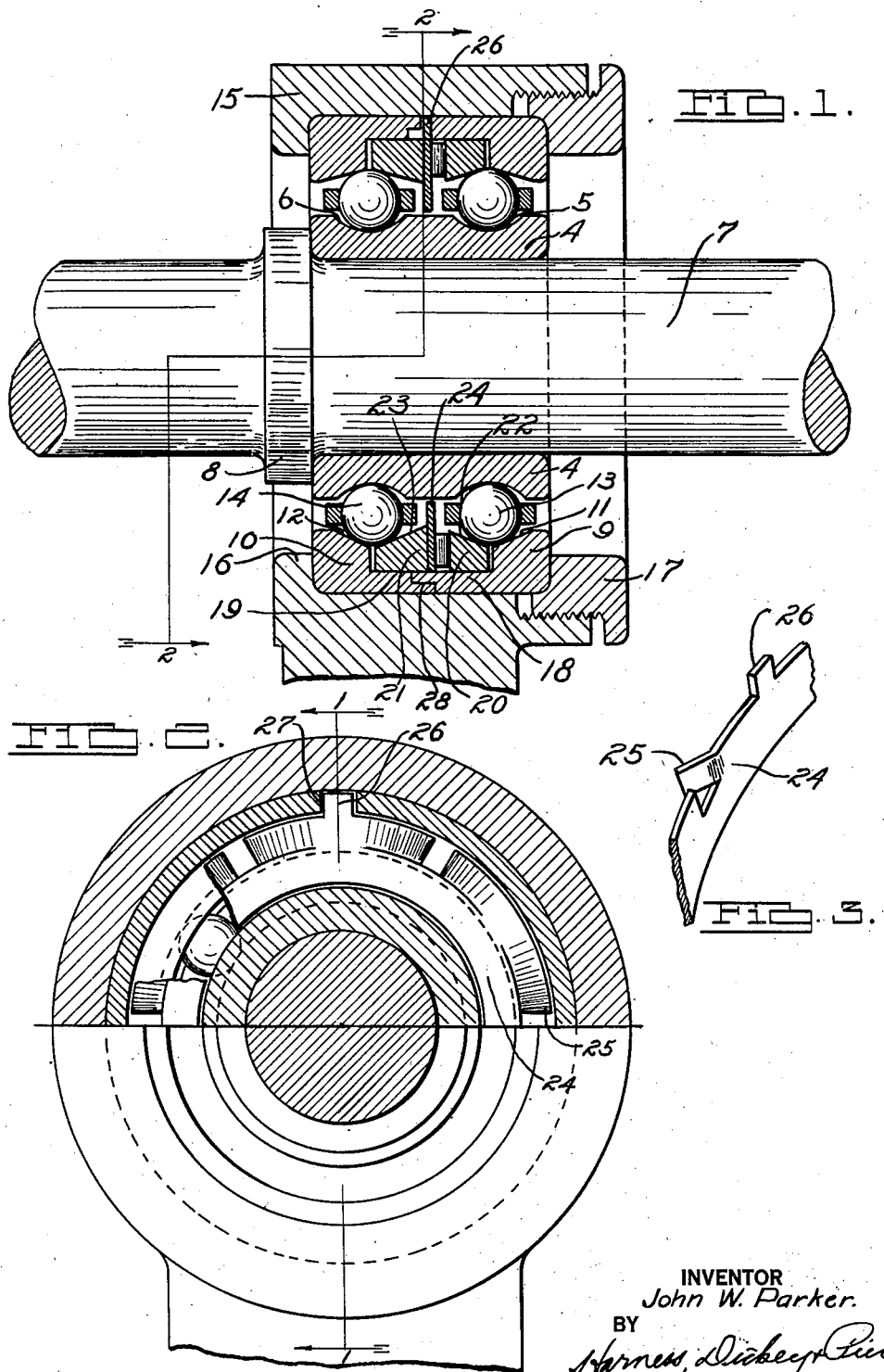
INVENTOR
John W. Parker.
BY
ATTORNEYS.

Patented Nov. 1, 1932

1,886,219

UNITED STATES PATENT OFFICE

JOHN W. PARKER, OF DETROIT, MICHIGAN

BEARING

Application filed September 27, 1929. Serial No. 395,652.

This invention relates to ball bearings particularly adapted for use on high speed shafts.

The main objects of this invention are to provide an improved ball bearing which will automatically take up any wear therein; to provide a ball bearing having a double row of axially spaced balls, each row of which has an axially movable race ring which is automatically and yieldingly urged toward its respective cooperating race ring so as to maintain a snug fit of the bearings at all times, and to provide a ball bearing for high speed use in which chattering is eliminated by automatic adjustment to compensate for wear.

An illustrative embodiment of this invention is shown in the accompanying drawing, in which Fig. 1 is a fragmentary medial longitudinal sectional view of the improved bearing in position on a base frame and supporting a shaft or spindle.

Fig. 2 is a sectional view taken on the line 2—2 of Fig. 1 looking in the direction indicated by the arrows.

Fig. 3 is a fragmentary view in perspective of the spring member which is interposed between the axially movable ball race rings.

In the construction shown in the drawing the improved bearing comprises an inner bearing member 4 having a pair of axially spaced radiused grooves 5 and 6 in the outer peripheral surface thereof. The inner bearing 4 is adapted to support an axially disposed shaft or spindle 7 in the usual way, and as shown is abutted against one side of an annular shoulder 8 integrally formed on the shaft.

An outer bearing member is provided which comprises a pair of outer race rings 9 and 10 which have inwardly sloping faces 11 and 12 respectively. The sloping faces 11 and 12 are adapted to engage the outer sides of two rows of ball bearings 13 and 14 respectively, which are interposed between the inner and outer rings and run in the grooves provided therefor.

The outer race rings 9 and 10 are mounted within a surrounding frame 15, one end of which is provided with a shoulder 16, against which the ring 10 abuts, and the other end of which is interiorly threaded to receive an exteriorly threaded ring 17 which abuts against the race ring 9. The outer rings 9 and 10 have axially extending flanges 18 and 19 respectively which support inner race rings 20 and 21 respectively. The rings 20 and 21 are axially slidable upon the flanges 18 and 19 and have outwardly sloping faces 22 and 23 respectively which are adapted to engage the inner sides of the two rows of ball bearings 13 and 14 respectively, thus forming angled grooves or races for the balls.

Automatic yielding means is provided for axially sliding the inner rings 20 and 21 outwardly and comprises an annular ring of spring steel 24 which has a plurality of spring tongues 25 struck out from the peripheral margin thereof. The spring member 24 is also provided with a radially extending tongue 26 integrally formed therewith which projects into a slot or notch 27 provided therefor in the outer race to prevent rotation of the member relative to the race rings.

The inner ends of the flanges 18 and 19 are provided with complementary portions as shown at 28 which overlap so as to maintain the race rings 9 and 10 in axial alignment.

In the operation of this bearing the outer race rings 9 and 10 are tightly clamped in the supporting frame 15 by the threaded ring 17. The spring steel ring 24 with its plurality of spring tongues 25 is so proportioned and assembled as to exert a constant yielding pressure between the race rings 20 and 21, thereby tending to slide them axially outwardly. This constant pressure on the inner rings automatically secures a tight and snug fit between the two rows of ball bearings and their respective races, thus securing an automatic adjustment to compensate for wear and the elimination of subsequent chattering due to a loose bearing when used in high speed operation.

Although but one specific embodiment of this invention has been herein shown and described, it will be understood that numerous details of the construction shown may be altered or omitted without departing from the spirit of this invention as defined by the following claims:—

What I claim is:

1. A bearing structure comprising, in combination, two annular bearing members one positioned within the other, one of said bearing members formed of two parts and having a groove formed between said parts, a pair of rings in said groove, said rings and parts having cooperating faces forming a pair of axially spaced, annular radially facing ball raceways, the other of said members having raceways formed therein in opposed relation to the first mentioned raceways, a plurality of balls received between each pair of opposed raceways, and means constantly urging said rings apart.

2. A bearing structure comprising, in combination, a pair of annular bearing members one positioned within the other, and one of which is provided in that face thereof opposed to a face of the other with an annular recess, said recessed face at opposite sides of said recess being tapered to form parts of a pair of raceways, a pair of rings in said recess, each having an inner face tapered in opposition to the corresponding tapered side of said recessed face, and cooperating therewith to form a pair of axially spaced raceways, the other of said members being formed to provide a pair of raceways in opposed relation to the first mentioned pair of raceways, a row of balls received between corresponding and opposed raceways in said members, and resilient means constantly urging said rings apart.

JOHN W. PARKER.